US010913385B2

(12) United States Patent
Langhoff

(10) Patent No.: US 10,913,385 B2
(45) Date of Patent: Feb. 9, 2021

(54) CONVERTIBLE SEAT ASSEMBLY FOR A TRUCK CAB

(71) Applicant: Volvo Truck Corporation, Göteborg (SE)

(72) Inventor: Richard V. Langhoff, Greensboro, NC (US)

(73) Assignee: VOLVO TRUCK CORPORATION, Gothenburg (SE)

(*) Notice: Subject to any disclaimer, the term of this patent is extended or adjusted under 35 U.S.C. 154(b) by 98 days.

(21) Appl. No.: 16/468,322

(22) PCT Filed: Dec. 12, 2016

(86) PCT No.: PCT/US2016/066066
§ 371 (c)(1),
(2) Date: Jun. 11, 2019

(87) PCT Pub. No.: WO2018/111217
PCT Pub. Date: Jun. 21, 2018

(65) Prior Publication Data
US 2019/0299840 A1    Oct. 3, 2019

(51) Int. Cl.
*B60J 7/00* (2006.01)
*B60P 3/39* (2006.01)
(Continued)

(52) U.S. Cl.
CPC .............. *B60P 3/39* (2013.01); *B60N 2/305* (2013.01); *B60N 2/3013* (2013.01); *B60N 2/34* (2013.01); *B60N 2/938* (2018.02); *B62D 65/14* (2013.01)

(58) Field of Classification Search
CPC ......... B62D 33/0612; B60P 3/40; B60R 9/00; A47C 17/80; A47C 17/2076; A47C 17/04;
(Continued)

(56) References Cited

U.S. PATENT DOCUMENTS 1,367,013 A * 2/1921 Bradshaw ............ A47C 17/165
                                              5/12.1
1,387,083 A * 8/1921 Welch ...................... B60N 2/34
                                              297/62
(Continued)

FOREIGN PATENT DOCUMENTS

DE    102008053961 A1    5/2010
DE    102010054090 A1    7/2011
(Continued)

OTHER PUBLICATIONS

Extended European Search Report for European Patent Application No. 16924058.7, dated Jun. 17, 2020, 9 pages.
(Continued)

*Primary Examiner* — Kiran B Patel
(74) *Attorney, Agent, or Firm* — Withrow & Terranova, PLLC

(57) ABSTRACT

A convertible seat assembly comprises a seat sub-assembly rotatably coupled to a substantially flat base member. The seat sub-assembly comprises a back member having a substantially flat first side and second side with a seat member coupled to the second side. The seat sub-assembly is rotatable between a sleeping configuration and a seating configuration. In the sleeping configuration, the substantially flat first side of the back member and the substantially flat base member form a substantially flat horizontal sleeping surface for at least one person. In the seating configuration, the seat member is deployed as a seating region for at least one person.

16 Claims, 15 Drawing Sheets

(51) Int. Cl.
*B60N 2/90* (2018.01)
*B60N 2/34* (2006.01)
*B62D 65/14* (2006.01)
*B60N 2/30* (2006.01)

(58) Field of Classification Search
CPC .... B60J 1/1853; B64D 11/0641; B64D 11/06; B64D 11/0601
See application file for complete search history.

(56) References Cited

U.S. PATENT DOCUMENTS

| | | | | |
|---|---|---|---|---|
| 2,504,769 A * | 4/1950 | Watter | | B61D 31/00 105/315 |
| 2,564,512 A * | 8/1951 | Specht | | B60P 3/38 5/2.1 |
| 2,953,103 A * | 9/1960 | Bohannon | | B61D 31/00 105/315 |
| 2,993,529 A * | 7/1961 | Brown | | A47C 17/1753 297/65 |
| 3,353,861 A * | 11/1967 | Letzel | | B60N 2/34 296/190.02 |
| 3,473,840 A * | 10/1969 | Miles | | B60N 2/34 296/69 |
| 3,879,081 A * | 4/1975 | Hockley | | B62D 33/0612 296/190.02 |
| 3,910,626 A * | 10/1975 | Hobbensiefken | | B60N 2/34 296/69 |
| 4,494,792 A * | 1/1985 | Quercy | | B60N 2/34 297/63 |
| 5,425,516 A * | 6/1995 | Daines | | B64D 11/06 105/316 |
| 5,658,046 A * | 8/1997 | Rus | | B60N 2/3013 16/4 |
| 5,954,398 A | 9/1999 | Namba et al. | | |
| 5,992,798 A * | 11/1999 | Ferry | | A47C 1/0352 244/118.6 |
| 6,102,463 A * | 8/2000 | Swanson | | B60N 2/3013 296/37.15 |
| 6,129,404 A * | 10/2000 | Mattarella | | B60N 2/3013 296/64 |
| 6,367,839 B1 * | 4/2002 | Langhoff | | B60R 22/28 280/751 |
| 6,644,724 B1 * | 11/2003 | Penaloza | | B62D 33/0612 296/190.02 |
| 6,793,265 B2 * | 9/2004 | Kamida | | B60N 2/3011 296/64 |
| 6,817,660 B2 * | 11/2004 | Ito | | B60N 2/3013 296/65.09 |
| 6,837,531 B2 * | 1/2005 | Mack | | B60N 2/3015 296/190.02 |
| 6,845,531 B2 * | 1/2005 | Kjellberg | | B60N 2/3009 5/118 |
| 6,899,379 B1 * | 5/2005 | Milenovich | | B62D 33/0612 296/190.02 |
| D556,467 S * | 12/2007 | Brown | | D6/356 |
| 7,837,262 B2 * | 11/2010 | Merensky | | B64D 11/0606 297/217.3 |
| 9,073,608 B1 | 7/2015 | Foss et al. | | |
| 10,343,730 B2 * | 7/2019 | Adam | | B62D 33/063 |
| 2003/0140416 A1 * | 7/2003 | Olenick | | B60N 2/345 5/118 |
| 2003/0141731 A1 | 7/2003 | Betts et al. | | |
| 2007/0158986 A1 | 7/2007 | Adams et al. | | |
| 2007/0216185 A1 | 9/2007 | McMillen | | |
| 2008/0191515 A1 * | 8/2008 | Hollenbeck | | B60P 3/36 296/190.02 |
| 2010/0140010 A1 * | 6/2010 | Hollenbeck | | B60N 2/753 180/334 |
| 2011/0309650 A1 * | 12/2011 | Seibold | | B60N 2/309 296/65.01 |
| 2013/0097782 A1 * | 4/2013 | Carrier | | A47C 17/80 5/607 |
| 2014/0210235 A1 | 7/2014 | Ferry et al. | | |
| 2015/0034580 A1 * | 2/2015 | Hofvander | | B60R 7/08 211/87.01 |
| 2015/0136904 A1 * | 5/2015 | Savard | | B60N 2/62 244/118.6 |
| 2016/0325838 A1 * | 11/2016 | Erhel | | B60N 2/34 |
| 2017/0217350 A1 * | 8/2017 | Saunders | | B60N 3/008 |

FOREIGN PATENT DOCUMENTS

| | | |
|---|---|---|
| DE | 11201110525 T5 | 2/2014 |
| DE | 112011105252 T5 | 2/2014 |
| EP | 2743183 A1 | 6/2014 |
| WO | 0130639 A1 | 5/2001 |
| WO | 2012158071 A1 | 11/2012 |

OTHER PUBLICATIONS

Tan, Deborah, "A Woman's Guide to Living a Full and Happy Life in a City Like Singapore," Material World, Car Reviews, Nov. 15, 2013, materialworldsingapore.wordpress.com/tag/car-review/, 11 pages.
International Search Report and Written Opinion for International Patent Application No. PCT/2016/066066, dated Mar. 9, 2017, 8 pages.

* cited by examiner

CONVERTIBLE SEAT ASSEMBLY FOR A TRUCK CAB

This application is a 35 USC 371 national phase filing of International Application No. PCT/US2016/066066, filed Dec. 12, 2016, the disclosure of which is incorporated herein by reference in its entirety.

FIELD OF THE DISCLOSURE

Embodiments include a seat assembly, and more particularly a convertible seat assembly for a truck cab.

BACKGROUND

Many commercial vehicles, such as semi-trucks, include a sleeping area within a vehicle cab, for use by one or more vehicle operators. These vehicle cabs are often referred to as sleeper cabs. Conventional sleeper cabs may include a sleeping surface, such as a cot or mattress assembly, disposed laterally, i.e., extending side-to-side, behind the driver and passenger seats of the cab. While convenient for a vehicle operator, the sleeping surface can take up the entire space behind the seats of the cab, and does not allow for any other use of that space. Accordingly, there is a need for a sleeper cab that uses the space within the cab more efficiently.

SUMMARY

Embodiments include a seat assembly, and more particularly a convertible seat assembly for a truck cab having a sleeping configuration and a seating configuration. In one embodiment, the convertible seat assembly comprises a back member rotatably coupled to a substantially flat base member. The back member has a first side with a substantially flat surface and second side with a seat member coupled thereto. The back member is rotatable between the sleeping configuration and the seating configuration. In the sleeping configuration, the substantially flat first side of the back member and the substantially flat base member form a substantially flat horizontal sleeping surface. In the seating configuration, the seat member is positioned to provide a seating region. One advantage of this arrangement is that a sleeping surface can be oriented longitudinally, i.e., front-to-back, along one side of the truck cab, e.g., a passenger-side, leaving a rear storage area available behind the driver's seat, which can be used for storage, work, or other activities.

According to one embodiment, a convertible seat assembly for a truck cab is disclosed. The convertible seat assembly comprises a base member having a substantially flat upper surface. The convertible seat assembly further comprises a back member having a first side with a substantially flat surface and a second side, the back member rotatably coupled to the base member for movement between a sleeping configuration and a seating configuration. The convertible seat assembly further comprises a seat member coupled to the second side of the back member. The first side of the back member in the sleeping configuration and the substantially flat upper surface of the base member form a substantially flat horizontal sleeping surface. The seat member in the seating configuration forms a seating region.

According to another embodiment, a truck cab is disclosed. The truck cab comprises a truck cab housing comprising a truck cab interior. The truck cab further comprises a convertible seat assembly. The convertible seat assembly comprises a base member having a substantially flat upper surface, the base member fixed with respect to the truck cab interior. The convertible seat assembly further comprises a back member having a first side with a substantially flat surface and a second side, the back member rotatably coupled to the base member for movement between a sleeping configuration and a seating configuration. The convertible seat assembly further comprises a seat member coupled to the second side of the back member. In the sleeping configuration, the substantially flat surface of the first side of the back member and the substantially flat upper surface of the base member form a substantially flat horizontal sleeping surface. The seat member in the seating configuration forms a seating region.

According to another embodiment, a method of installing a convertible seat assembly for a truck cab is disclosed. The method comprises fixing a base member having a substantially flat upper surface in a vehicle interior. The method further comprises rotatably coupling a back member to the base member, the back member having a first side with a substantially flat surface and a second side with a seat member coupled thereto, the back member rotatable between a sleeping configuration and a seating configuration. The substantially flat surface of the first side of the back member in the sleeping configuration and the substantially flat upper surface of the base member form a substantially flat horizontal sleeping surface for at least one person. The seat member in the seating configuration forms a seating region for at least one person.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
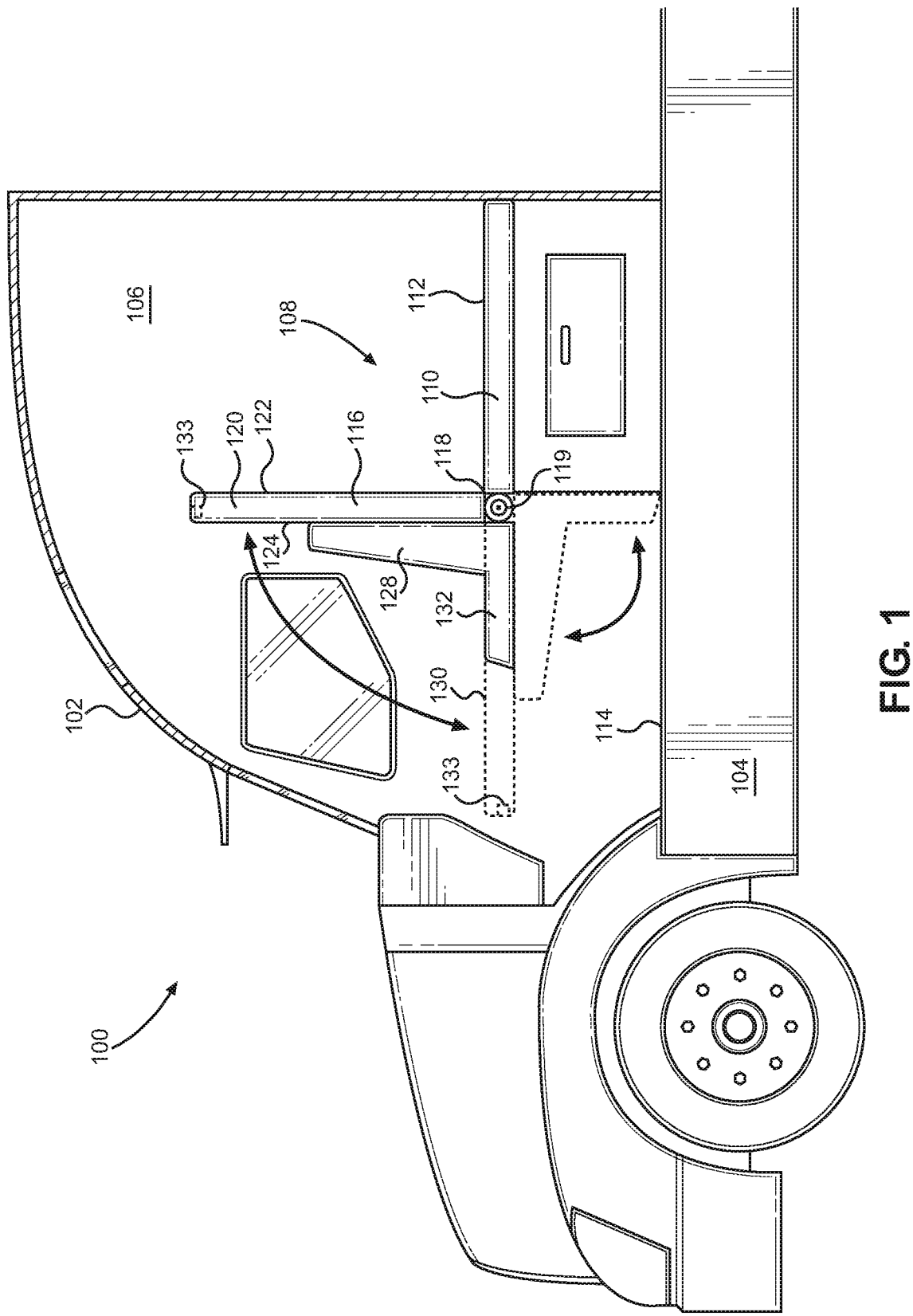
FIG. 1 illustrates a truck cab having a seat assembly that is convertible between a sleeping configuration and a seating configuration, according to an embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments include a seat assembly, and more particularly a convertible seat assembly for a truck cab having a sleeping configuration and a seating configuration. In one embodiment, the convertible seat assembly comprises a back member rotatably coupled to a substantially flat base member. The back member has a first side with a substantially flat surface and second side with a seat member coupled thereto. The back member is rotatable between the sleeping configuration and the seating configuration. In the sleeping configuration, the substantially flat first side of the back member and the substantially flat base member form a substantially flat horizontal sleeping surface. In the seating configuration, the seat member is positioned to provide a seating region. One advantage of this arrangement is that a sleeping surface can be oriented longitudinally, i.e., front-to-back, along one side of the truck cab, e.g., a passenger-side, leaving a rear storage area available behind the driver's seat, which can be used for storage, work, or other activities.

In this regard, FIG. 1 illustrates a truck cab 100 having a truck cab housing 102 mounted on a truck chassis 104. A truck cab interior 106 of the truck cab 100 includes a convertible seat assembly 108 convertible between a seating configuration and a sleeping configuration. The convertible seat assembly 108 comprises a base 110 having a substantially flat upper surface 112. In this embodiment, the base 110 is fixed with respect to a floor 114 of the truck cab interior 106. The convertible seat assembly 108 further comprises a seat sub-assembly 116 rotatably coupled to the base 110 via a hinge 118 for rotation between the sleeping configuration and the seating configuration. The seat sub-assembly 116 comprises a back member 120 having a first side 122 and a second side 124, the first side 122 having a substantially flat surface, and a seat member 128 coupled to the second side of the back member 120. In the sleeping configuration, the substantially flat surface of the first side 122 of the seat sub-assembly 116 and the substantially flat upper surface 112 of the base 110 form a substantially flat horizontal sleeping surface 130 for at least one person. In the seating configuration, the seat member 128 of the seat sub-assembly 116 forms a seating region 132 for at least one person.

The hinge 118 in this embodiment includes a bias mechanism 119, which may be a torsion spring, to bias the seat sub-assembly 116 with respect to the base 110. In this embodiment, the bias mechanism 119 of the hinge 118 biases the seat sub-assembly 116 toward the seating configuration. Alternatively, the bias mechanism 119 may bias the seat sub-assembly 116 toward the sleeping configuration. The hinge 118 may also include a lock mechanism 133, to secure the hinge 118 selectively in the seating configuration or the sleeping configuration. The bias mechanism 119 and the lock mechanism 133 in this example are both part of the hinge 118, but it should be understood that the bias mechanism 119 and lock mechanism 133 may be part of other components, or may be separate components, as desired. For example, in this embodiment, the lock mechanism 133 is a latch for selectively engaging with a portion of the truck cab interior 106.

Figure 2A:
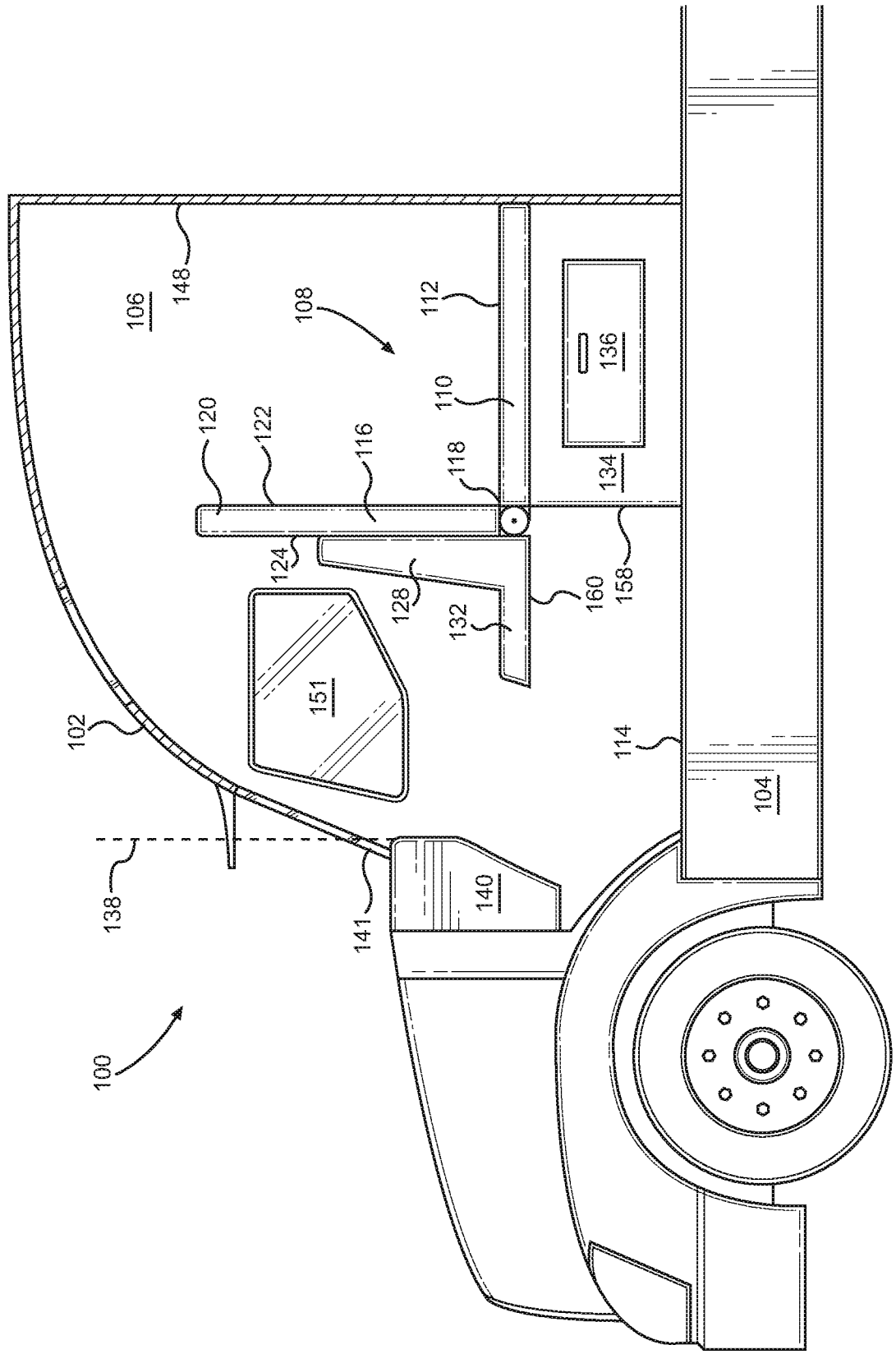
FIGS. 2A and 2B illustrate side and top views of the truck cab and convertible seat assembly of FIG. 1 in the seating configuration.
Figure 2B:
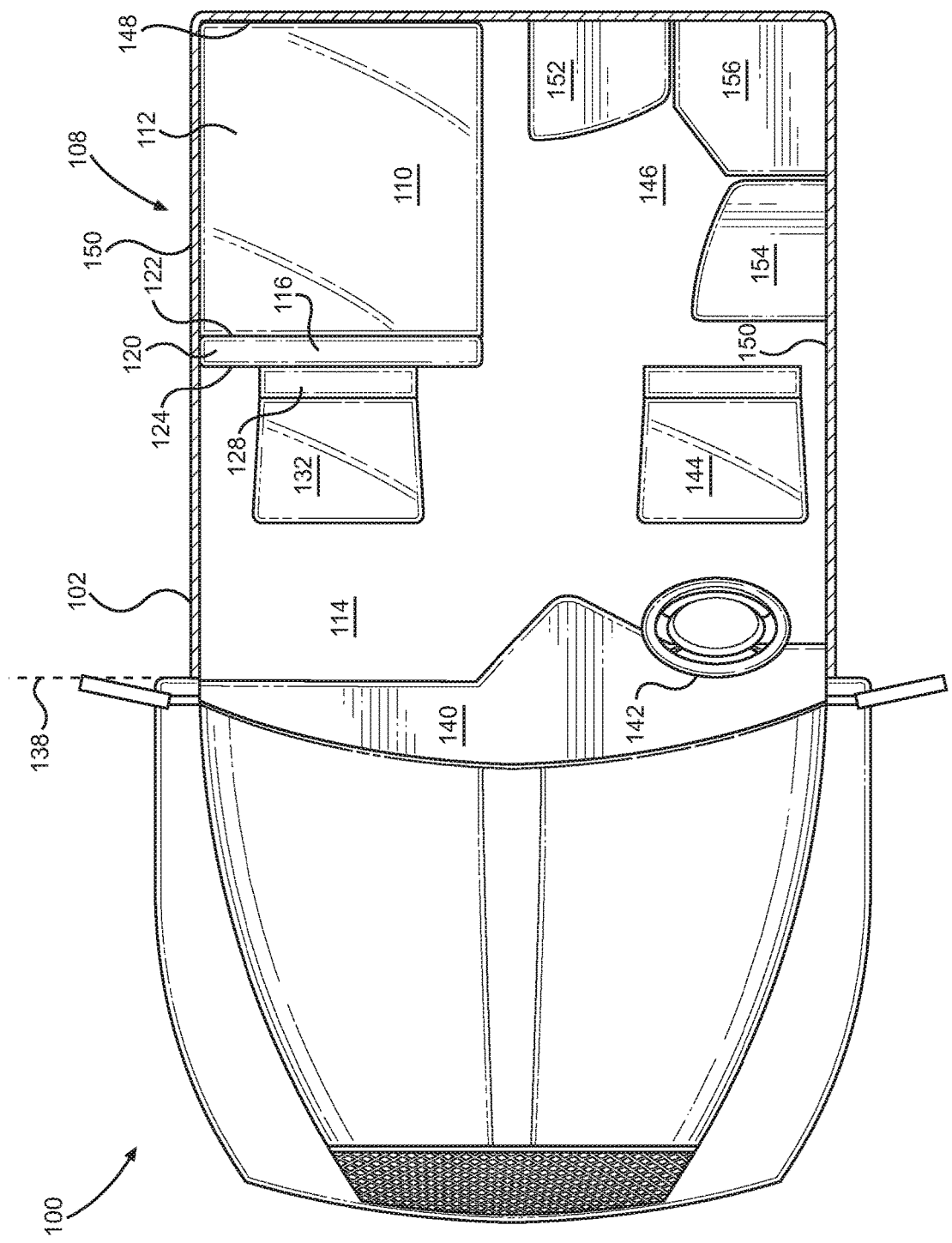

Referring now to FIGS. 2A and 2B, side and top views of the truck cab 100 are illustrated to show details of the convertible seat assembly 108 and other components of the truck cab housing 102. In this regard, the base 110 includes a base support 134 secured to the floor 114 of the truck cab interior 106. The base support 134 may be permanently or removably secured to the floor 114 as desired. The base support 134 may also provide one or more storage compartments, such as a drawer 136.

In this embodiment, in the seating configuration, the seating region 132 is forward-facing, a forward end 138 of the truck cab interior 106 being partially defined by the location of a dashboard 140 and front windshield 141. As can be seen in FIG. 2B, the dashboard 140 includes a steering wheel 142 on the driver-side, and a driver's seat 144 positioned laterally opposite the seating region 132 on the passenger side of the truck cab interior 106. The vertical orientation of the seat sub-assembly 116 portion in the seating configuration allows access to the passenger-side door (not illustrated). In addition, the position of the convertible seat assembly lateral to the driver's seat provides a relatively large rear storage area 146 behind the driver's seat 144. The rear storage area 146 is bounded longitudinally by the driver's seat 144 and a rear wall 148 of the truck cab interior 106, and is bounded laterally by the base 110 and a side wall 150 of the truck cab interior 106. As shown in FIG. 2B, the side wall 150 may also include one or more side windows 151 and one or more cab doors (not shown) of the truck cab housing 102. In this embodiment, the rear storage area 146 may include one or more storage compartments, such as, for example, a rear storage compartment 152 secured to the rear wall 148, a side storage compartment 154 secured to the side wall 150, and/or a corner storage compartment 156 secured to one or more of the rear wall 148 and the side wall 150. As will be discussed in greater detail with respect to FIGS. 10 and 11, the arrangement of the storage compartments 152, 154, 156 in the rear storage area 146 may be customized based on manufacturer or user preference.

Figure 3A:
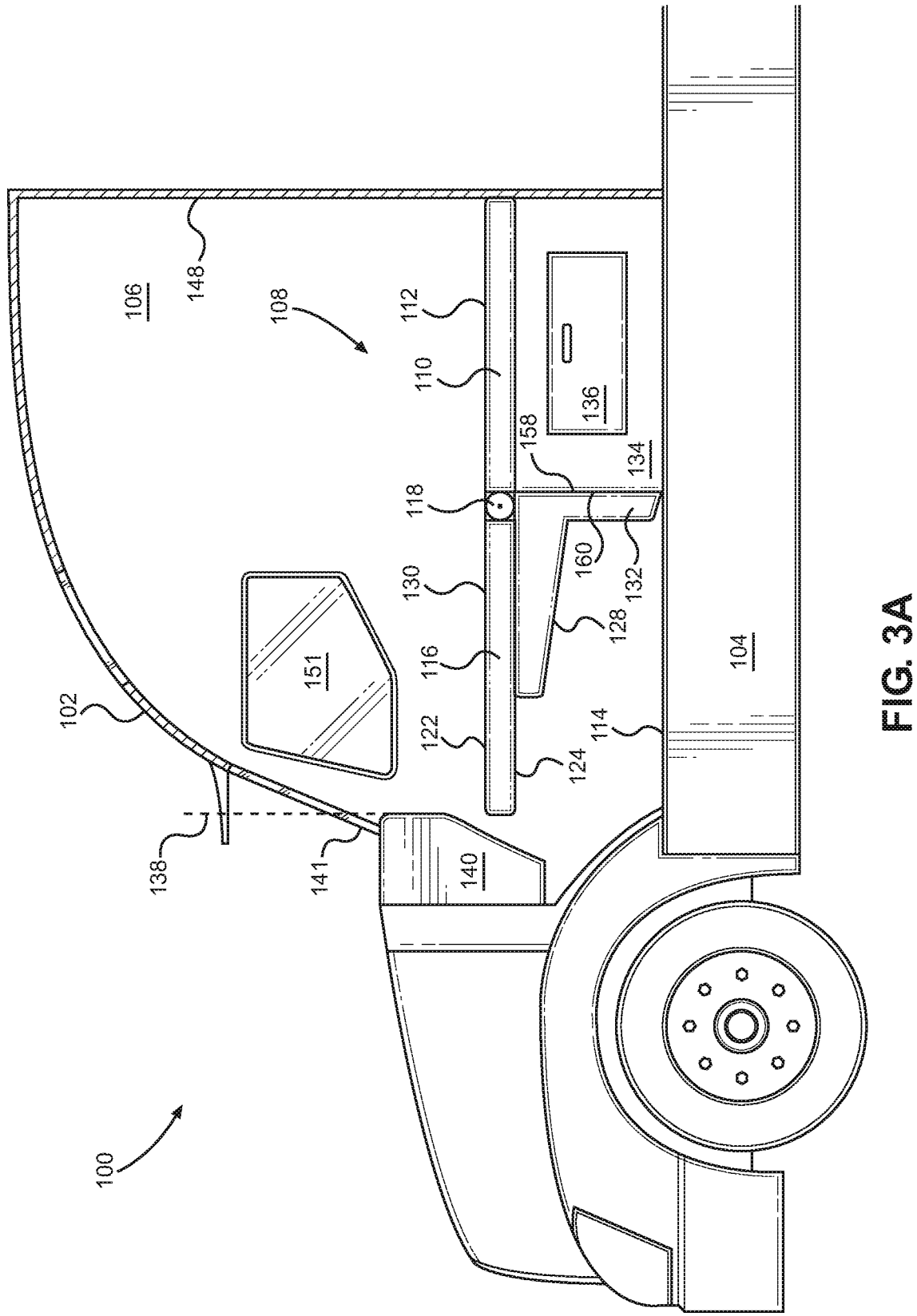
FIGS. 3A and 3B illustrate side and top views of the truck cab and convertible seat assembly of FIG. 1 in the sleeping configuration.
Figure 3B:
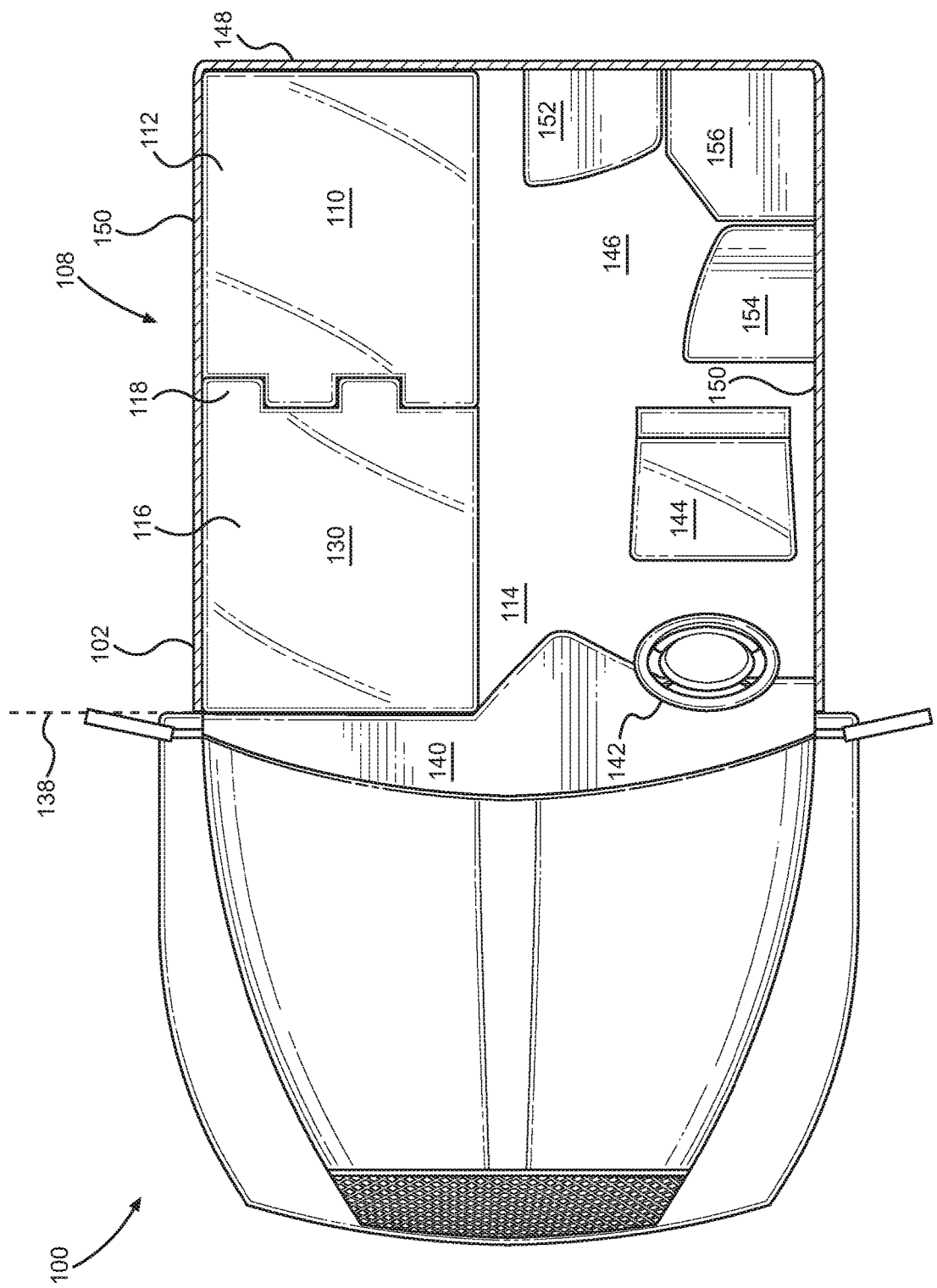

As shown in FIG. 2A, the base support 134 includes a front wall providing a vertical base support stop 158, and the seat member 128 includes a seat bottom providing a complementary seat member stop 160. The seat member stop 160 is horizontal when the seat sub-assembly 116 is in the seating configuration. Referring now to FIGS. 3A and 3B, the seat member stop 160 abuts the vertical base support stop 158 when the seat sub-assembly 116 is in the sleeping configuration. This allows the seat member 128, which has a rigid structure in this embodiment, to provide support for the back member 120 extending longitudinally forward from the base 110. In this manner, the upper surface 112 of the base 110 and the horizontal sleeping surface 130 of the seat sub-assembly 116 are substantially horizontally coplanar with each other, so as to provide a combined support surface suitable for a mattress (not shown) or other cushioning arrangement.

Figure 4:
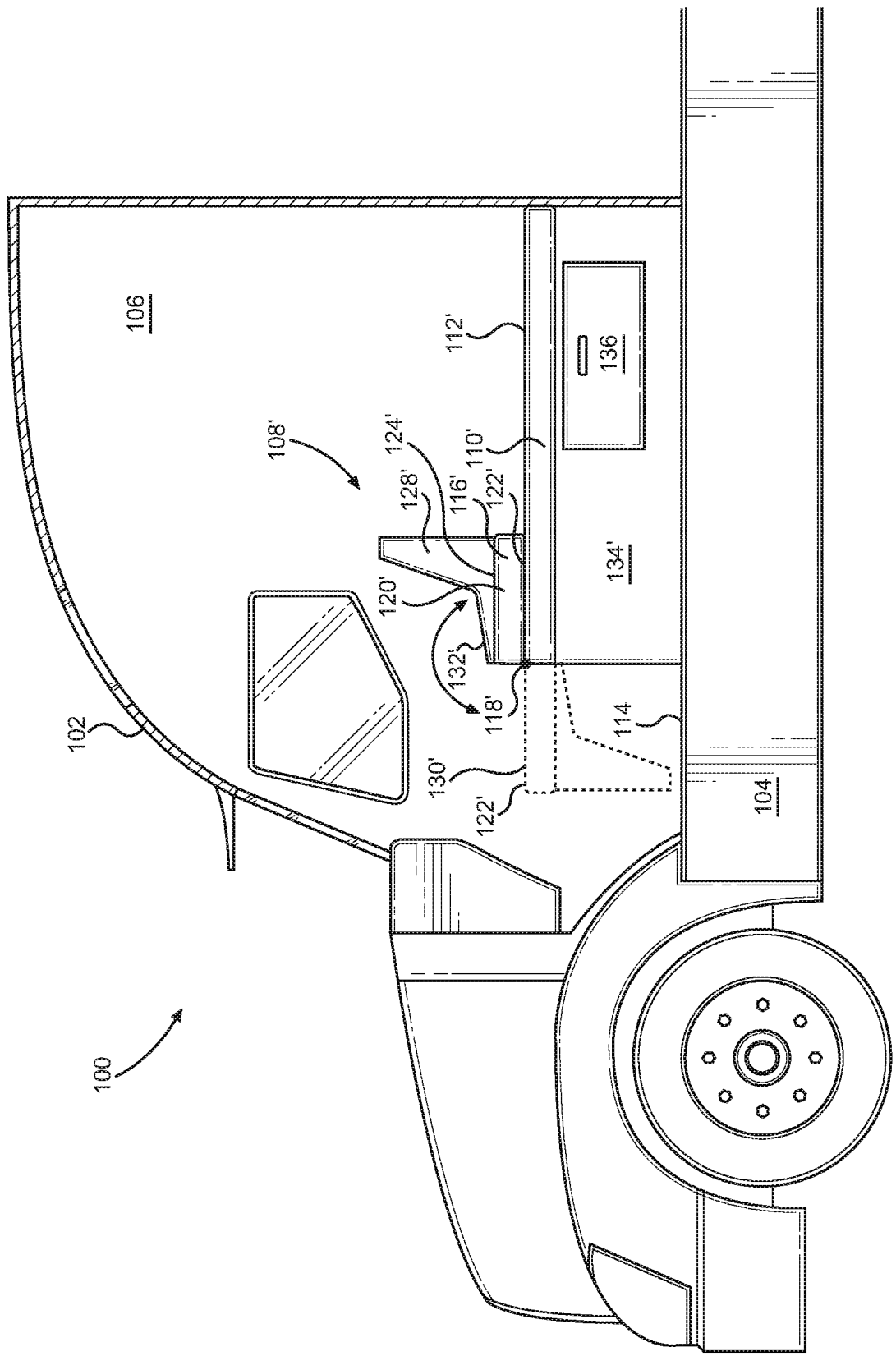
FIG. 4 illustrates a convertible seat assembly similar to the convertible seat assembly of FIG. 1, wherein the seat assembly is rotatable 180 degrees between the sleeping configuration and the seating configuration, according to an alternative embodiment.

In this embodiment, the back member 120 of the seat sub-assembly 116 is rotated substantially 90 degrees between the seating configuration and the sleeping configuration. It should be understood, however, that other configurations are contemplated in which the back member 120 of the seat sub-assembly 116 is rotated more or less than 90 degrees between the seating configuration and the sleeping configuration. FIG. 4 illustrates an alternative convertible seat assembly 108' having a seat sub-assembly that rotates 180 degrees between the seating configuration and the sleeping configuration. In this example, the back member 120' of the convertible seat assembly 108' in the seating configuration is completely folded over the base 110', so that the first side 122' of the back member 120' is facing and substantially parallel to the substantially flat upper surface 112' of the base 110'. In this embodiment, the seat member 128' may be coupled to or integral with the second side 124' of the base 110' to form the seating region 132'.

Figure 5:
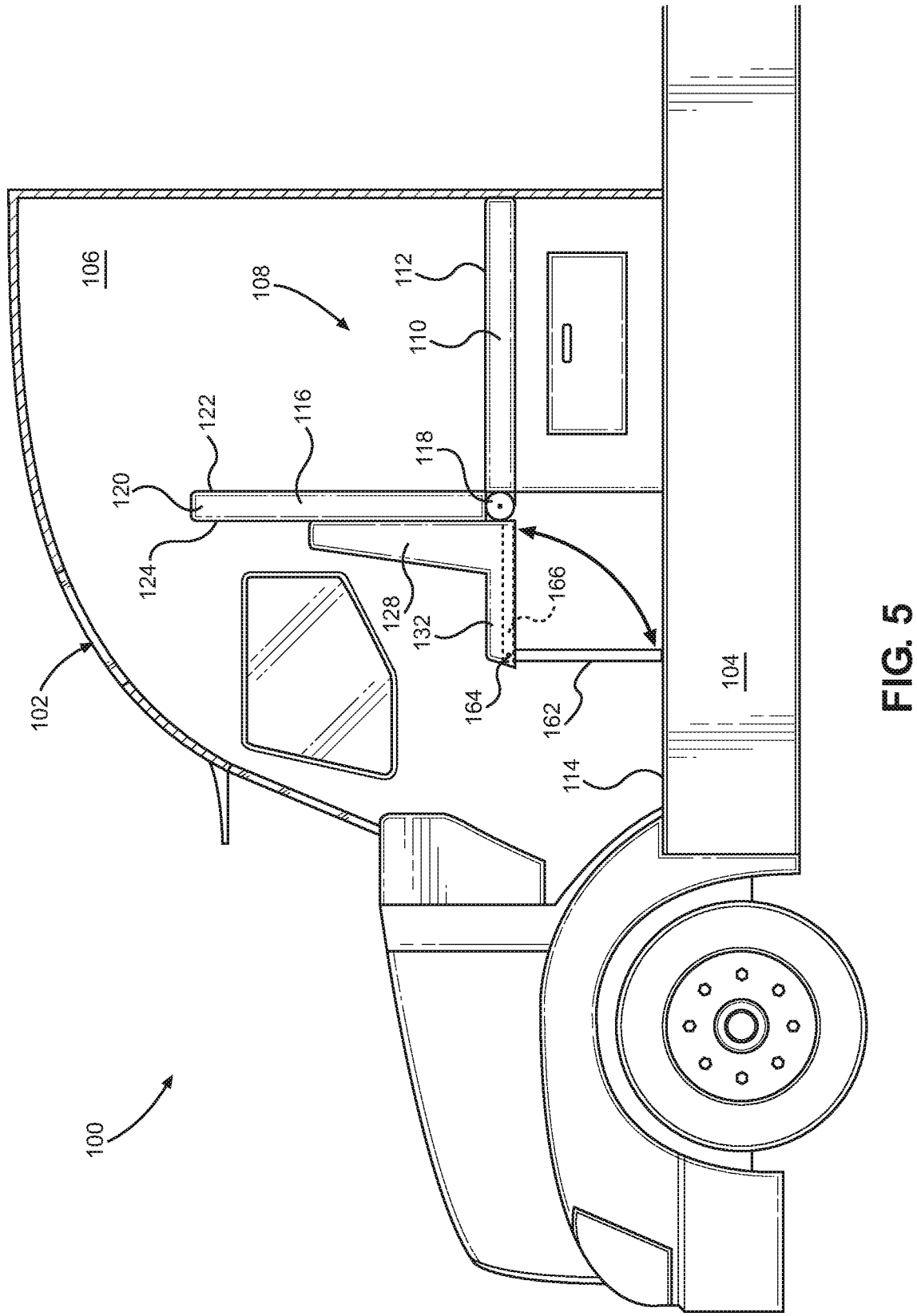
FIG. 5 illustrates the convertible seat assembly of FIG. 1 having one or more stowable seat support legs, according to an embodiment.

It should be understood that other components may be used to support the seat sub-assembly, such as seat sub-assembly 116, in the seating configuration and/or in the sleeping configuration, as desired. In this regard, FIG. 5 illustrates a stowable seat support leg 162 that may be mounted by a hinge 164 to the seat member 128 and rotated between a stowed and a deployed position. The seat support leg 162, when deployed, extends vertically from the hinge 164 to the floor 114 of the truck cab interior 106, to provide additional support for the seat member 128 when the seat sub-assembly 116 is in the seating configuration. When transitioning the seat sub-assembly 116 to the sleeping configuration, the seat support leg 162 can be rotated about the hinge 164 and stowed in a recess 166 within the seat member 128.

Figure 6:
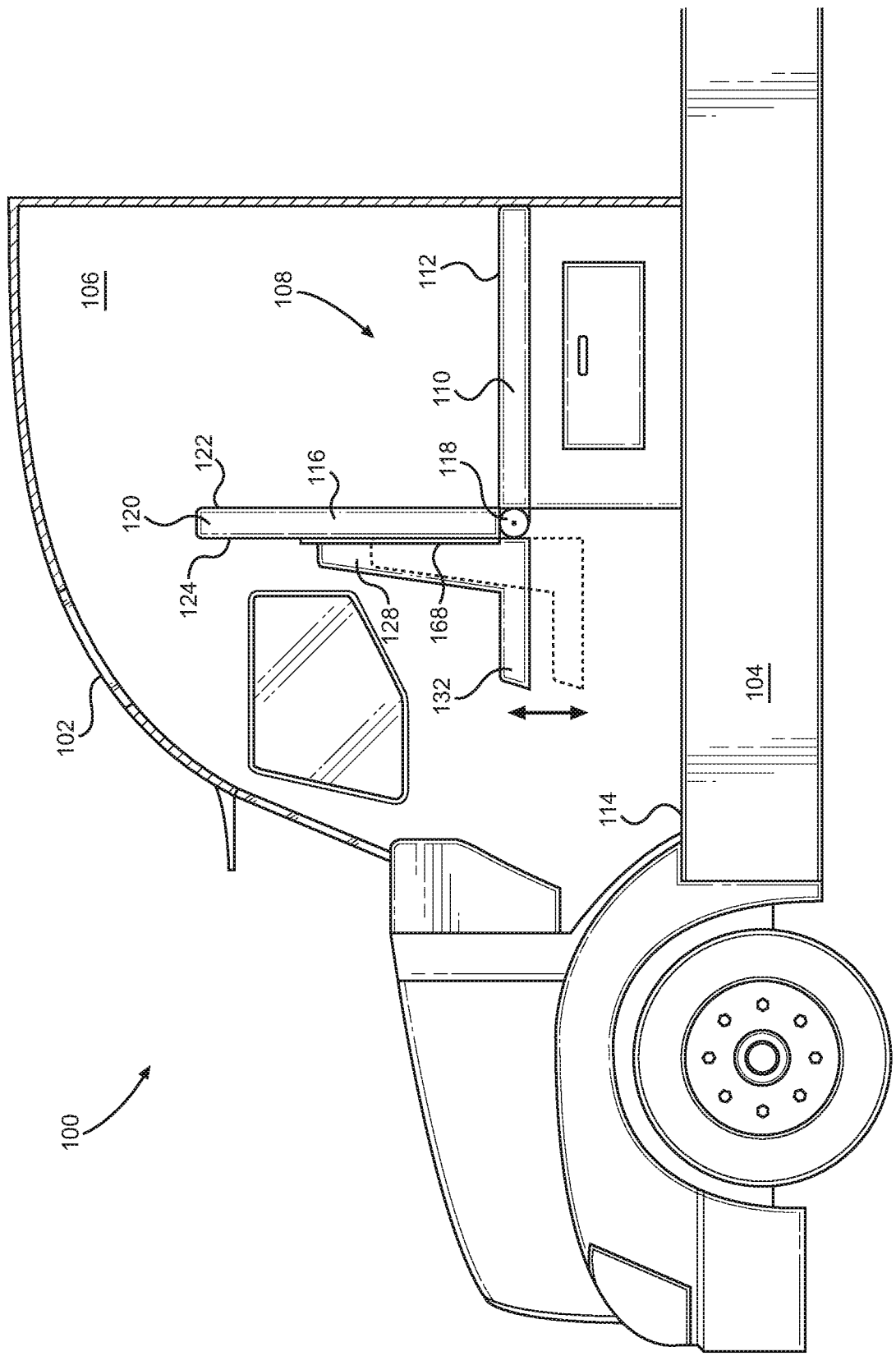
FIG. 6 illustrates the convertible seat assembly of FIG. 1 having an adjustment mechanism for moving a seat member with respect to a back member of the seat assembly.

In this embodiment, the seat member 128 is a separate component that is fixed with respect to the back member 120, but it should be understood that other configurations are contemplated. For example, in one embodiment, the seat member 128 and the back member 120 may be formed as a single component. In an alternative embodiment, the seat member 128 may be movable with respect to the back member 120. FIG. 6 illustrates a vertical adjustment mechanism 168 that is coupled between the back member 120 and the seat member 128 of the seat sub-assembly 116. The vertical adjustment mechanism 168, which is a selectively movable rail in this example, allows the seat member 128 to be selectively moved to any of a plurality of vertical positions along the back member 120 of the seat sub-assembly 116, as desired.

Figure 7:
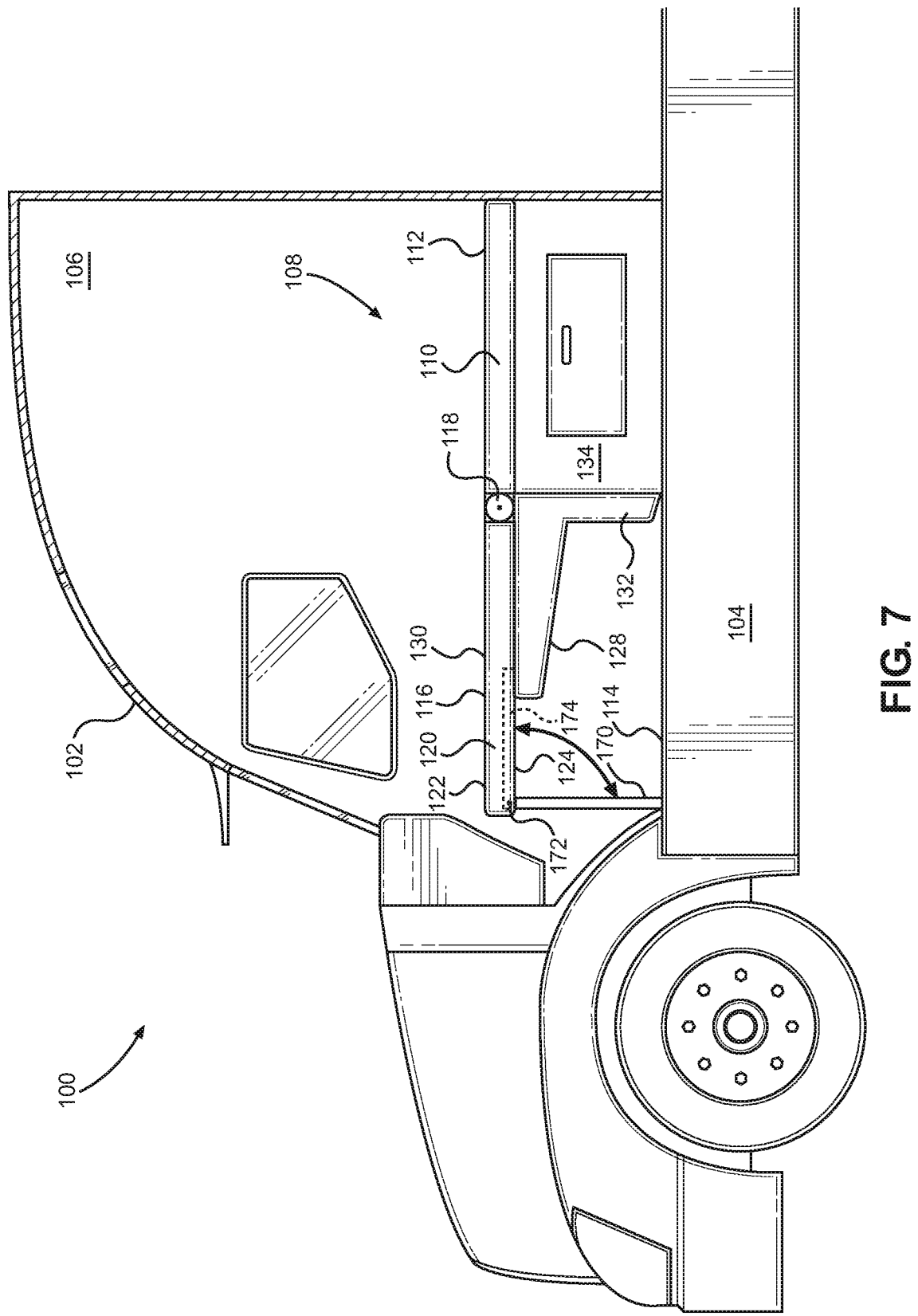
FIG. 7 illustrates the convertible seat assembly of FIG. 1 having one or more stowable sleeping surface support legs, according to an embodiment.

Additional supports for the seat sub-assembly 116 may also be provided when the seat sub-assembly 116 is in the sleeping configuration. In this regard, FIG. 7 illustrates a sleeping surface support leg 170 rotatably connected to the back member 120 by a hinge 172. When the seat sub-assembly 116 is in the sleeping configuration, the sleeping surface support leg 170 may be rotated about the hinge 172 so that the sleeping surface support leg 170 extends vertically between the back member 120 and the floor 114 of the truck cab interior 106, to provide additional support for the seat sub-assembly 116. Similar to the seat support leg 162 of FIG. 5, the sleeping surface support leg 170 can be stowed within the back member 120 when not in use by rotating the sleeping surface support leg 170 about the hinge 172 into a recess 174 in the back member 120.

Figure 8:
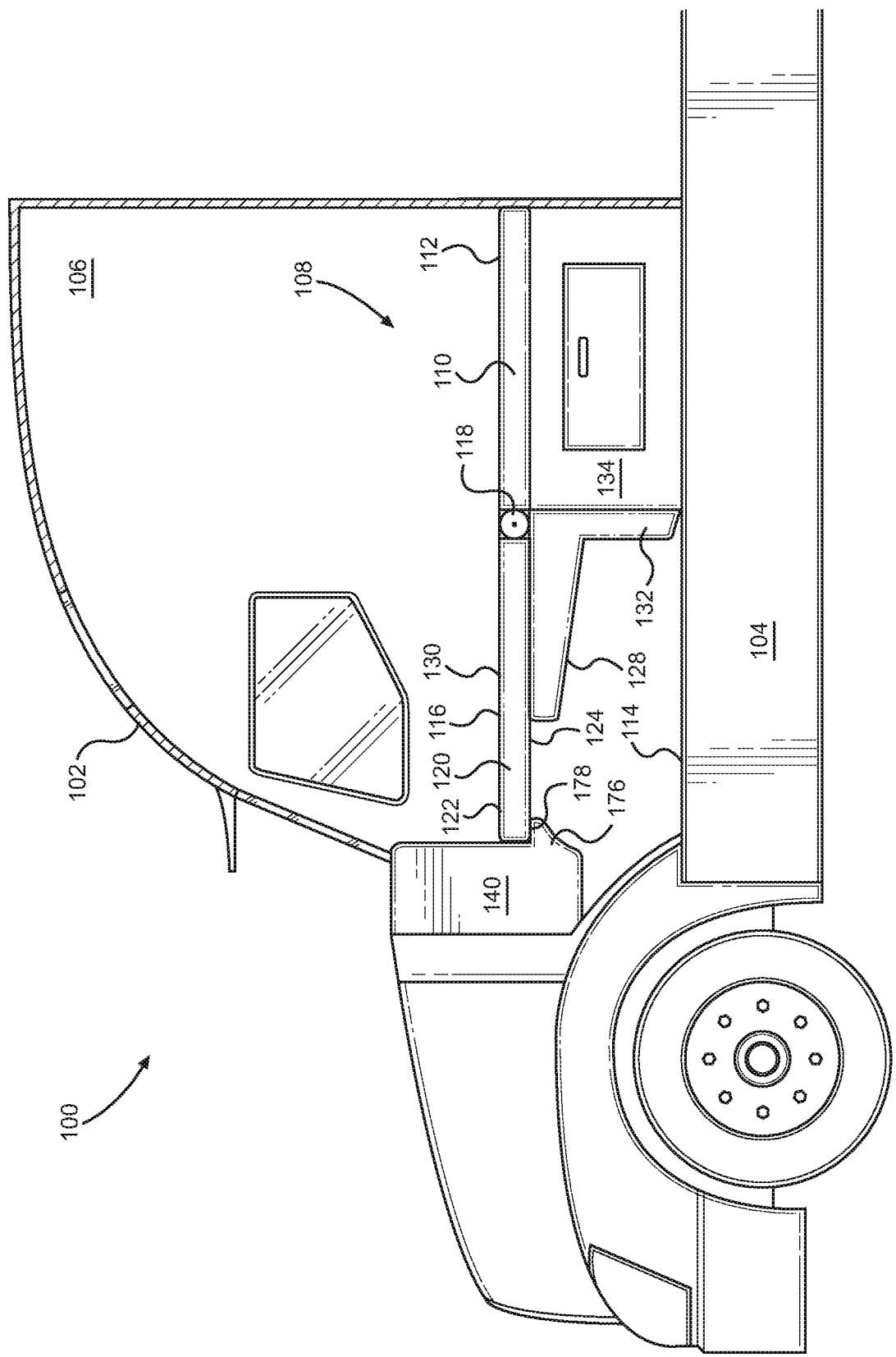
FIG. 8 illustrates the convertible seat assembly of FIG. 1 having a dashboard support member for supporting the seat assembly in the sleeping configuration, according to an embodiment.

The seat sub-assembly 116 may also be supported by other components within the truck cab interior 106. FIG. 8 illustrates a dashboard support member 176 extending horizontally from the dashboard 140. The dashboard support member 176, illustrated here as a ledge extending from the dashboard 140, engages and supports a complementary sleeping surface engagement portion 178 of the seat sub-assembly 116 when the seat sub-assembly 116 is in the sleeping configuration. The sleeping surface engagement portion 178, which may be an end of the back member 120, rests on and is supported by the dashboard support member 176 to maintain the horizontal sleeping surface 130 of the back member 120 substantially horizontally coplanar with the upper surface 112 of the base 110 when the seat sub-assembly 116 is in the sleeping configuration.

Figure 9:
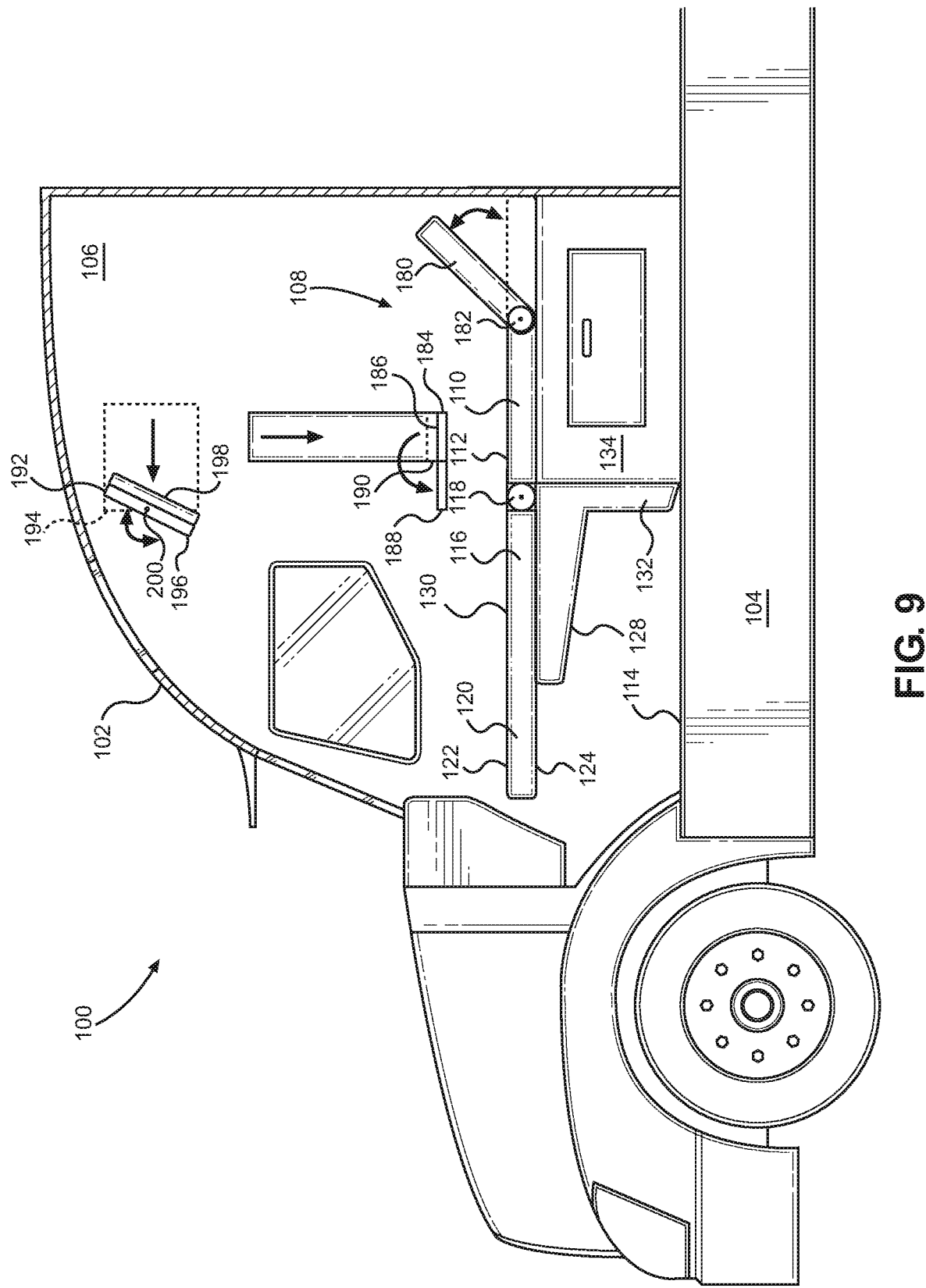
FIG. 9 illustrates the convertible seat assembly of FIG. 1 having a forward-facing incliner member for supporting a user, according to an embodiment.

Additional features may also be provided to enhance the comfort of the user of the convertible seat assembly 108. In this regard, FIG. 9 illustrates a forward-facing incliner member 180 rotatably connected to the base 110 by a hinge 182. The forward-facing incliner member 180 may be selectively rotatable between a horizontal sleeping configuration and one or more inclined configurations, which allow the user to rest on the base 110 in a number of recliner positions. In this embodiment, a stowable tray 184 is provided for use by a user resting against the forward-facing incliner member 180. The stowable tray 184 includes a tray member 186 having a fold-out extension member 188 connected to the tray member 186 by a hinge 190. When not in use, the stowable tray 184 may be stowed vertically against or within the side wall 150.

A stowable display screen sub-assembly 192 may also be provided, which is rotatable from a stowed position substantially parallel to the side wall 150, to a deployed position via a hinge 194. A display arm 196 supports a display screen 198 which is rotatable about a hinge 200 to orient the display screen 198 towards a field of view of a user reclining on the base 110 and the forward-facing incliner member 180.

Figure 10:
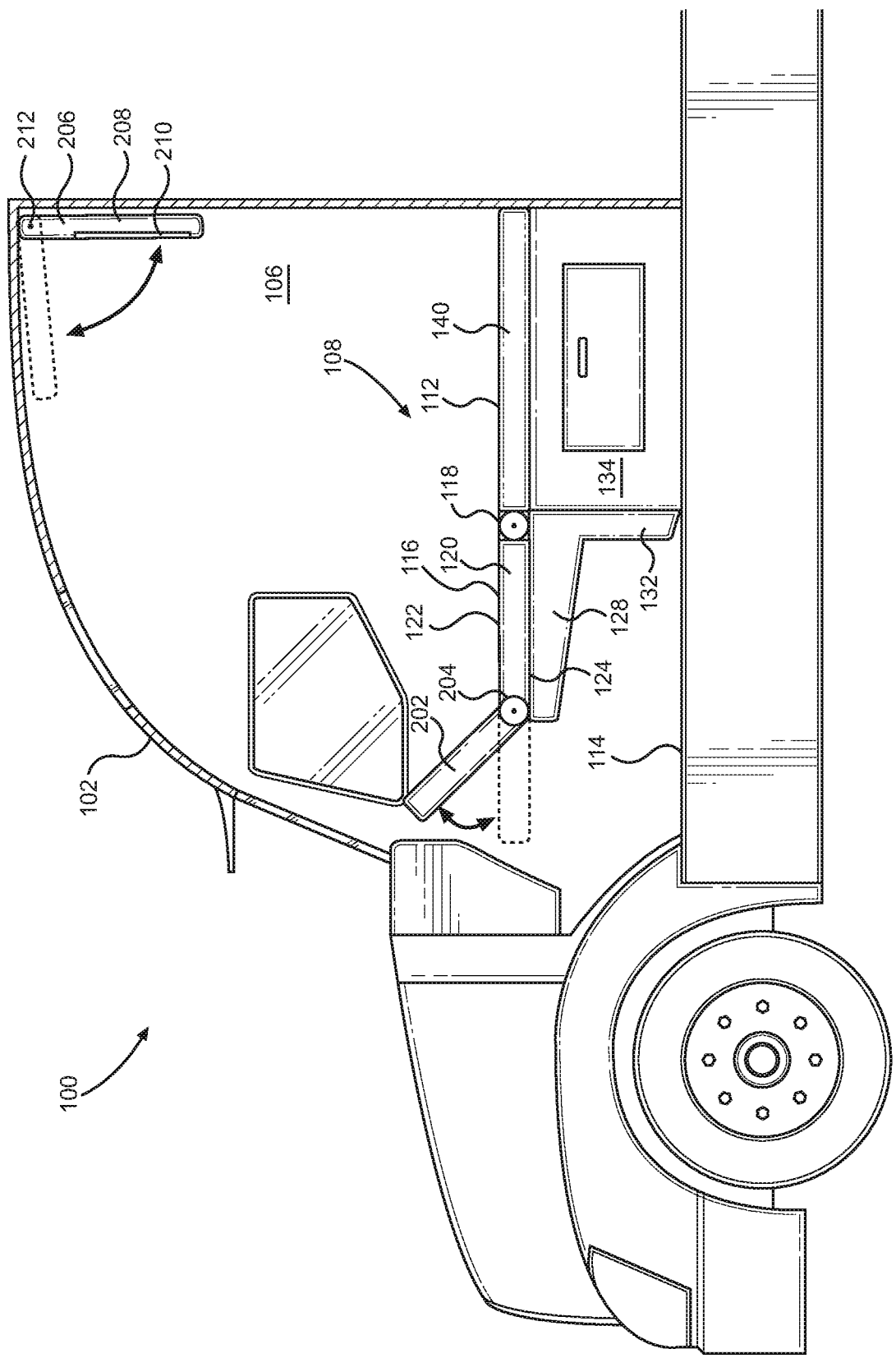
FIG. 10 illustrates the convertible seat assembly of FIG. 1 having a rear-facing incliner member for supporting a user, according to an embodiment.

Referring now to FIG. 10, an alternative rear-facing incliner member 202 is illustrated. The rear-facing incliner member 202 is rotatable about a hinge 204 with respect to the back member 120 of the seat sub-assembly 116. In this embodiment, a stowable display screen sub-assembly 206 includes an extension member 208 and display screen 210 rotatable between a stowed position and a deployed position about a hinge 212. In the deployed position, the display screen 210 is oriented towards a field of view of a rear facing user reclining on the back member 120 and the rear-facing incliner member 202 of the seat sub-assembly 116.

Figure 11:
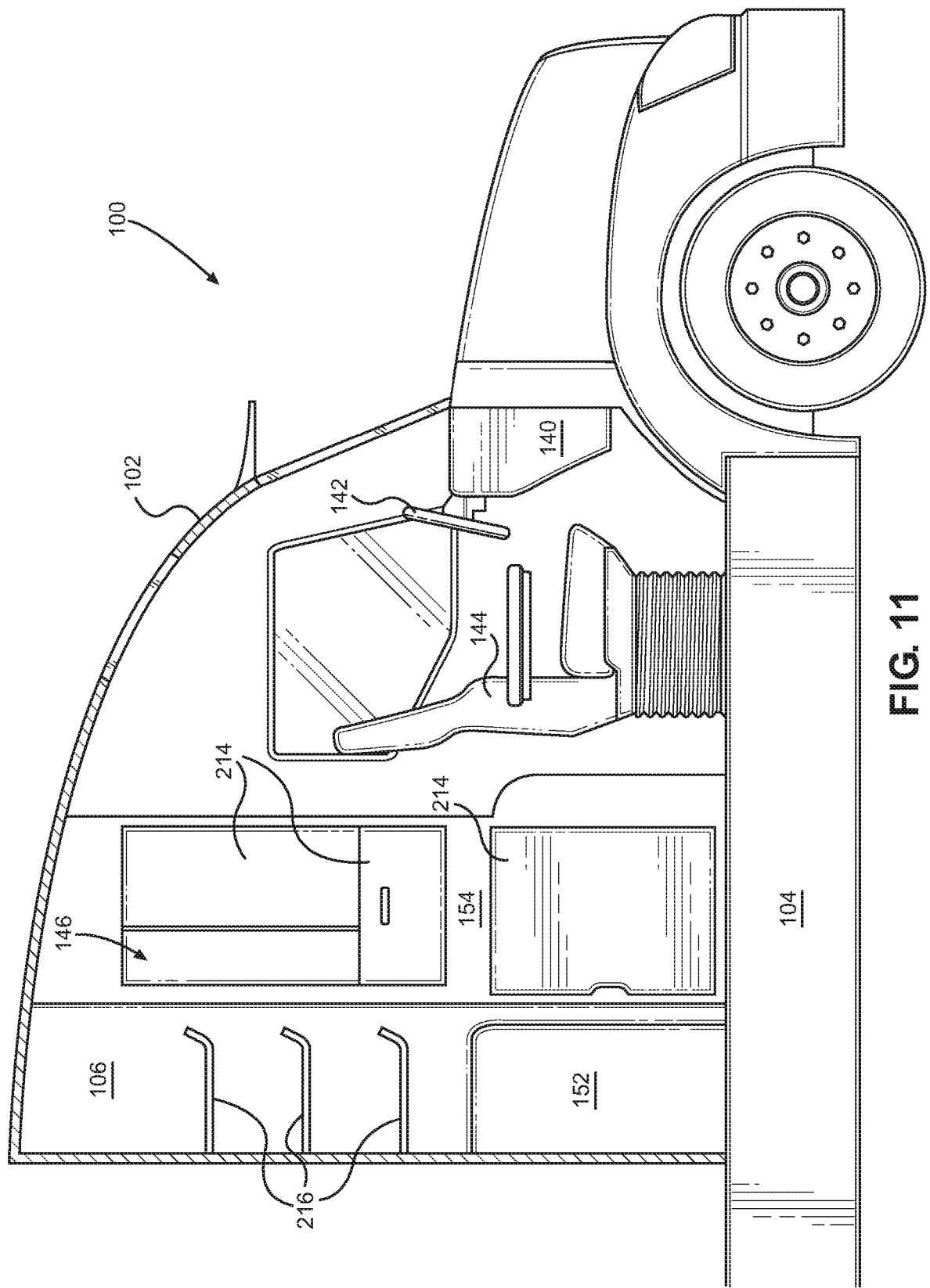
FIG. 11 illustrates a side view of a rear storage area showing additional details thereof, according to an embodiment.
Figure 12:
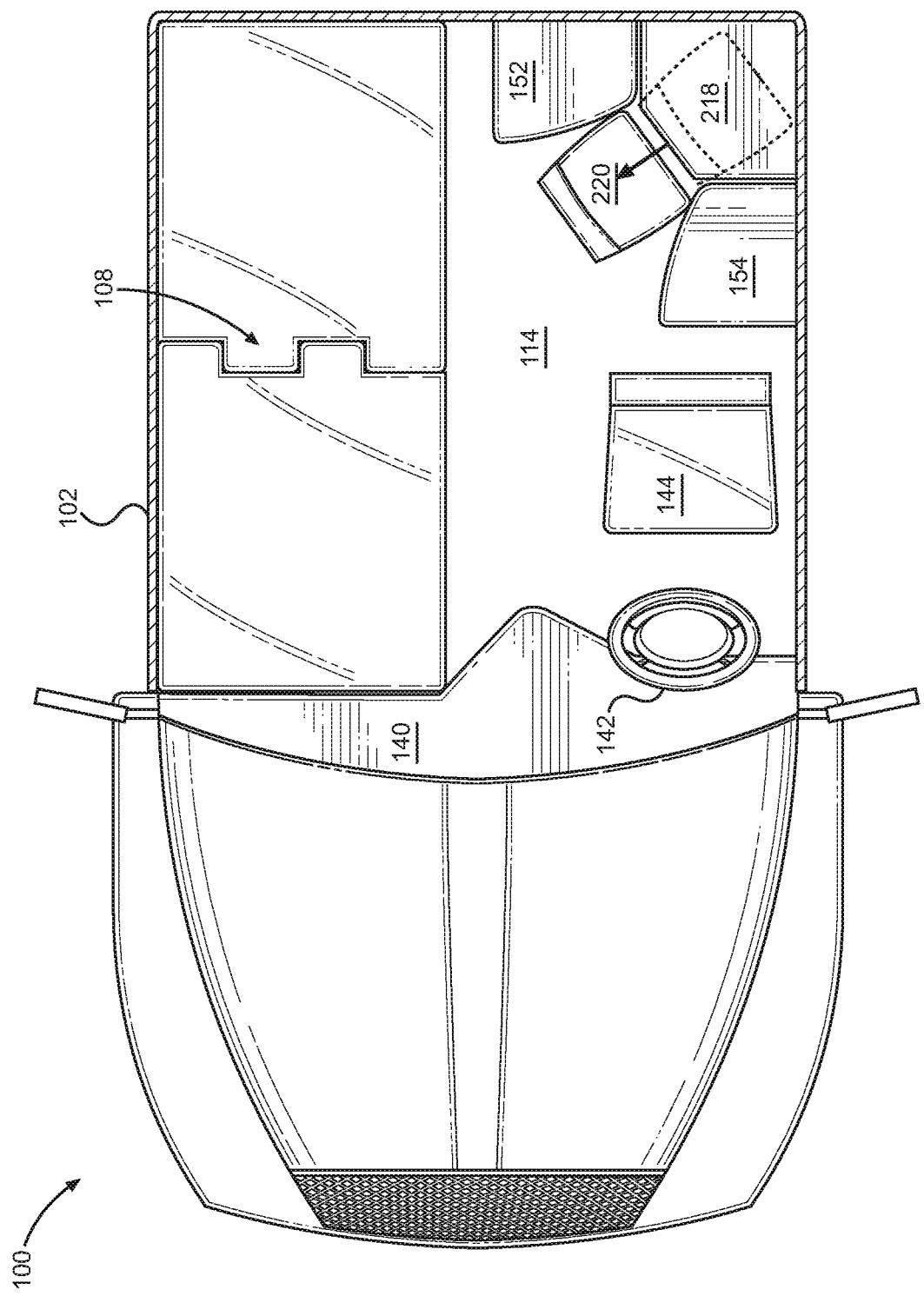
FIG. 12 illustrates a top view of the rear storage area showing alternative features thereof, according to an embodiment.

FIG. 11 illustrates a side view of the rear storage area 146 disposed between the driver's seat 144 and the rear wall 148 of the truck cab interior 106. In this embodiment, the storage compartments 152 and 154 may include a number of different storage sub-compartments 214 and/or shelves 216, as desired. As shown by FIG. 12, in addition, one or more storage compartments (corner storage compartment 156 in this example) may be substituted with different components. In this example, a desk 218 is provided in the corner of the rear storage area 146 between the rear storage compartment 152 and side storage compartment 154. A small movable chair or stool 220 may be stowed underneath the desk 218 when not in use, and may be pulled out for use by a user as needed. In another embodiment, one or more of the storage compartments 152, 154, 156 may be substituted with other components, such as a shower, sink, or another component (not shown).

Figure 13:
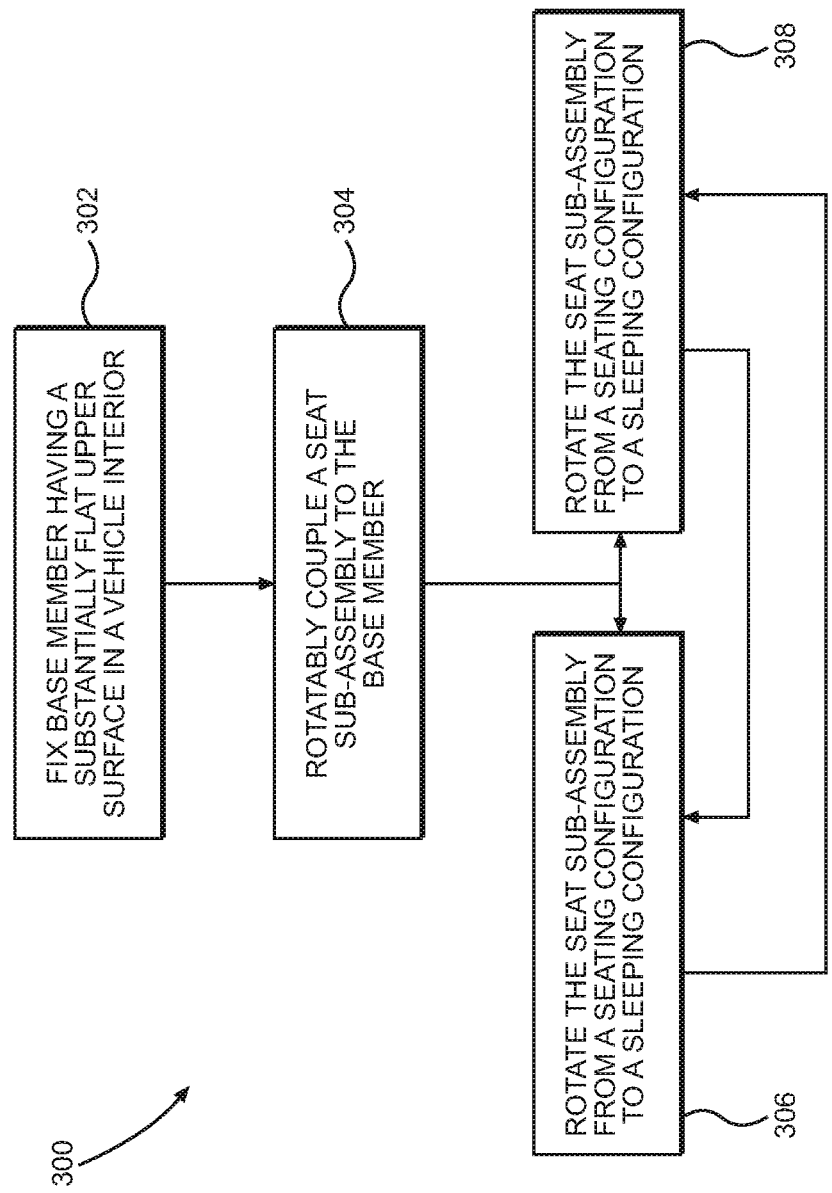
FIG. 13 is a flowchart of a method of installing a convertible seat assembly similar to the convertible seat assembly of FIG. 1, according to an embodiment.

Referring now to FIG. 13, a flowchart of a method 300 of installing a convertible seat assembly for a truck cab, such as the convertible seat assembly 108 of FIG. 1 above, is illustrated. The method 300 comprises fixing a base member, such as the base 110 of FIG. 1 above, having a substantially flat upper surface in a vehicle interior (Block 302). The method 300 further comprises rotatably coupling a seat sub-assembly, such as the back member 120 or the seat sub-assembly 116 of FIG. 1 above, to the base member (Block 304). As with the embodiment of FIG. 1 above, the seat sub-assembly is rotatable between a sleeping configuration and a seating configuration, such that a user can selectively rotate the seat sub-assembly from the sleeping configuration to the seating configuration (Block 306), and rotate the seat sub-assembly from the seating configuration to the sleeping configuration (Block 308).

As with the embodiment of FIG. 1 above, the seat sub-assembly of the method 300 also comprises a back member and a seat member coupled thereto. The back member has a substantially flat first side and a second side. In the sleeping configuration, the substantially flat surface of the first side of the seat sub-assembly and the substantially flat upper surface of the base member form a substantially flat horizontal sleeping surface for at least one person. In the seating configuration, the seat member of the seat sub-assembly forms a seating region for at least one person.

Those skilled in the art will recognize improvements and modifications to the preferred embodiments of the present disclosure. All such improvements and modifications are considered within the scope of the concepts disclosed herein and the claims that follow.

What is claimed is:

1. A convertible seat assembly for a truck cab, the convertible seat assembly comprising:
    a base member having a substantially flat upper surface;
    a back member having a first side with a substantially flat surface and a second side, the back member rotatably coupled to the base member for movement between a sleeping configuration and a seating configuration; and
    a seat member coupled to the second side of the back member;
    wherein the first side of the back member in the sleeping configuration and the substantially flat upper surface of the base member form a substantially flat horizontal sleeping surface, and
    wherein the seat member in the seating configuration forms a seating region.

2. The convertible seat assembly of claim 1, further comprising a rotatable hinge coupled between the base member and the back member.

3. The convertible seat assembly of claim 2, further comprising a bias mechanism coupled to the rotatable hinge to bias the back member toward one of the sleeping configuration or the seating configuration.

4. The convertible seat assembly of claim 1, further comprising a leg member movable between a stowed configuration when the back member is in the sleeping configuration and a deployed configuration supporting the seat member in the seating configuration.

5. The convertible seat assembly of claim 1, further comprising a leg member movable between a stowed configuration when the back member is in the seating configuration and a deployed configuration supporting the back member in the sleeping configuration.

6. The convertible seat assembly of claim 1, further comprising a lock mechanism for selectively securing the back member in the sleeping configuration or the seating configuration.

7. The convertible seat assembly of claim 6, wherein the lock mechanism comprises a latch for selectively engaging with a portion of an interior of the truck cab to secure the back member in at least one of the sleeping configuration or the seating configuration.

8. The convertible seat assembly of claim 1, wherein the base member further comprises a stop that engages a stop formed on the back member for supporting the back member in the sleeping configuration.

9. A truck cab comprising:
a truck cab housing comprising a truck cab interior;
a convertible seat assembly comprising:
- a base member having a substantially flat upper surface, the base member fixed with respect to the truck cab interior;
- a back member having a first side with a substantially flat surface and a second side, the back member rotatably coupled to the base member for movement between a sleeping configuration and a seating configuration; and
- a seat member coupled to the second side of the back member;
wherein the substantially flat surface of the first side of the back member in the sleeping configuration and the substantially flat upper surface of the base member form a substantially flat horizontal sleeping surface, and
wherein the seat member in the seating configuration forms a seating region.

10. The truck cab of claim 9, wherein the truck cab interior further comprises a dashboard support member supporting the back member in the sleeping configuration.

11. The truck cab of claim 9, wherein the back member and the seat member in the seating configuration form a forward facing seat with respect to the truck cab interior.

12. The truck cab of claim 9, wherein the truck cab interior comprises a driver-side seat and wherein the back member and the seat member in the seating configuration form a passenger-side seat laterally opposite the driver-side seat.

13. The truck cab of claim 12, wherein the substantially flat horizontal sleeping surface in the sleeping configuration extends longitudinally between a forward portion of the truck cab interior and a rear portion of the truck cab interior.

14. The truck cab of claim 13, wherein the back member and the seat member in the seating configuration form a forward facing seat with respect to the truck cab interior.

15. The truck cab of claim 13, wherein the driver-side seat and the base member define a storage area in the truck cab interior.

16. A method of installing a convertible seat assembly for a truck cab, the method comprising:
fixing a base member having a substantially flat upper surface in a vehicle interior;
rotatably coupling a back member to the base member, the back member having a first side with a substantially flat surface and a second side with a seat member coupled thereto, the back member rotatable between a sleeping configuration and a seating configuration,
wherein the substantially flat surface of the first side of the back member in the sleeping configuration and the substantially flat upper surface of the base member form a substantially flat horizontal sleeping surface for at least one person, and
wherein the seat member in the seating configuration forms a seating region for at least one person.

* * * * *